(12) United States Patent
Wadhawan et al.

(10) Patent No.: US 9,693,204 B2
(45) Date of Patent: Jun. 27, 2017

(54) SYSTEM AND METHOD FOR CONVEYING INFORMATION USING BROADCAST FRAMES

(71) Applicant: Aruba Networks, Inc., Sunnyvale, CA (US)

(72) Inventors: Anupam Wadhawan, San Jose, CA (US); Rajini Balay, Fremont, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 178 days.

(21) Appl. No.: 14/610,700

(22) Filed: Jan. 30, 2015

(65) Prior Publication Data

US 2016/0128021 A1 May 5, 2016

Related U.S. Application Data

(60) Provisional application No. 62/073,744, filed on Oct. 31, 2014.

(51) Int. Cl.

| | |
|---|---|
| *H04W 72/00* | (2009.01) |
| *H04W 4/06* | (2009.01) |
| *H04W 36/08* | (2009.01) |
| *H04W 48/08* | (2009.01) |
| *H04W 48/20* | (2009.01) |
| *H04W 76/02* | (2009.01) |
| *H04W 24/10* | (2009.01) |
| *H04W 24/02* | (2009.01) |
| *H04W 74/00* | (2009.01) |
| *H04W 72/08* | (2009.01) |
| *H04W 84/12* | (2009.01) |

(52) U.S. Cl.
CPC ............. *H04W 4/06* (2013.01); *H04W 24/02* (2013.01); *H04W 24/10* (2013.01); *H04W 36/08* (2013.01); *H04W 48/08* (2013.01); *H04W 48/20* (2013.01); *H04W 74/002* (2013.01); *H04W 76/02* (2013.01); *H04W 72/082* (2013.01); *H04W 84/12* (2013.01)

(58) Field of Classification Search
CPC ................. H04L 12/5692; H04L 69/18; H04L 29/12839; H04L 61/2596; H04L 61/6022; H04W 24/02; H04W 24/10; H04W 72/082; H04W 76/02; H04W 84/12
USPC ........................................................ 370/312
See application file for complete search history.

(56) References Cited

U.S. PATENT DOCUMENTS

| | | | |
|---|---|---|---|
| 2006/0187873 A1* | 8/2006 | Friday .................... | H04W 48/20 370/328 |
| 2014/0328257 A1* | 11/2014 | Kamlani ............... | H04W 24/02 370/329 |

* cited by examiner

*Primary Examiner* — Jae Y Lee
*Assistant Examiner* — Jean F Voltaire
(74) *Attorney, Agent, or Firm* — Brooks, Cameron & Huebsch, PLLC

(57) ABSTRACT

The present disclosure discloses a system and a method for conveying information using broadcast frames. Specifically, a network device detects a first wireless signal comprising a beacon frame transmitted by an access point in a network. The network device then identifies a radio Frequency (RF) channel indicated in the beacon frame. Responsive to identifying the RF channel in the beacon frame, the network device selects the RF channel to convey information to one or more network elements using a broadcast frame. Moreover, the network device transmits the broadcast frame to the one or more network elements. Note that, the broadcast frame includes information corresponding to a detected second wireless signal.

21 Claims, 5 Drawing Sheets

| CLIENT MAC 300 | ID OF BROADCAST DEVICE 320 | RSSI 340 |
|---|---|---|

FIG. 3

| CHANNEL IDENTIFIER 400 | INFORMATION ELEMENT TIMESTAMP 420 |
|---|---|

FIG. 4

SYSTEM AND METHOD FOR CONVEYING INFORMATION USING BROADCAST FRAMES

RELATED APPLICATION

This application claims priority to U.S. provisional patent application No. 62/073,744, entitled "System and Method for Conveying Information Using Broadcast Frames," filed on Oct. 31, 2014, the entirety of which is incorporated herein by reference.

FIELD

Embodiments of the present disclosure relate to network sensory devices. In particular, embodiments of the present disclosure describe a system and a method for conveying information using broadcast frames.

BACKGROUND

Low cost sensor devices (e.g., location monitors) can be deployed densely because they can be built at relatively cheap cost. These sensor devices typically will not have wired connections or interfaces to configure from. They have a wireless interface through which they can communicate to the wireless network. However, connecting to wireless network needs prior provisioning. Conventionally, sensor devices can only connect to the wireless network by being provisioned prior to their deployment.

DETAILED DESCRIPTION

In the following description, several specific details are presented to provide a thorough understanding. While the context of the disclosure is directed to network sensors, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

FIG. 3 shows a block diagram illustrating exemplary collected information according to embodiments of the present disclosure.

FIG. 4 shows a block diagram illustrating exemplary information maintained according to embodiments of the present disclosure.

OVERVIEW

Figure 1:
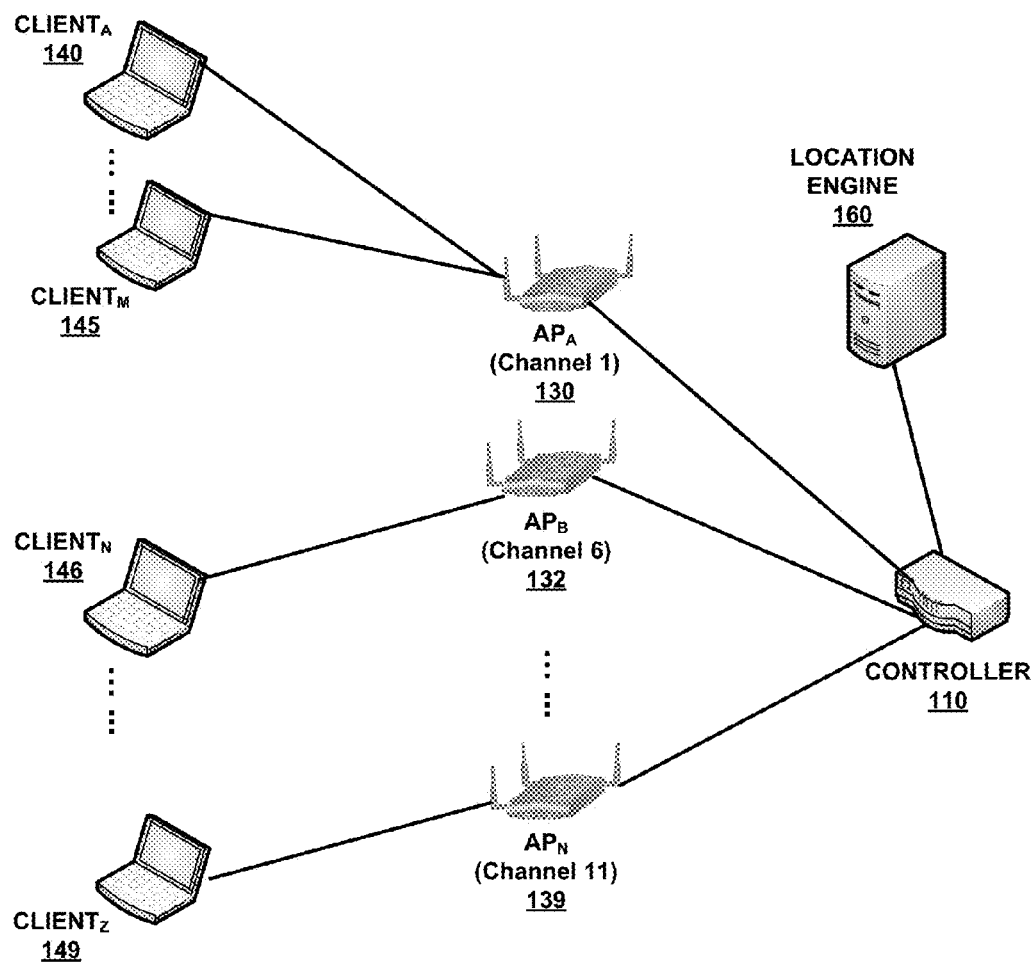
FIG. 1 shows an exemplary network environment according to embodiments of the present disclosure.

Embodiments of the present disclosure relate to network sensor devices in a wireless local area network. In particular, embodiments of the present disclosure describe a method and system for conveying information using broadcast frames.

In general, location monitors according to embodiments of the present disclosure generally refer to a very low cost dual-radio access point that scans across wireless channels and sends this information to access points. To save cost, they can be deployed without a wired connection that is typical in regular access points.

The techniques described herein involve a method where sensor device need not be provisioned to function. Specifically, a sensor device (e.g, a location monitor) just needs to be powered up because the functionalities of the location monitor device is hardcoded into the hardware. Thus as soon as the sensor device (e.g., location monitor) powered up, it can start injecting information, such as, received signal strength indicator (RSSI) information about wireless client devices in its vicinity to the wireless access points in its vicinity. The wireless access points need not stray from their home channels to either scan or receive information from location monitors.

Moreover, sensor devices (e.g., location monitors) described herein can listen to specific information elements (IE) in the beacons of the access points providing wireless access in the site. From this information element, the location monitor can learn the channel in which the access points are operating and are willing to learn scan information. Then, the sensor device (e.g., location monitor) can select the anchor access points from the many access points that it will typically hear. Optionally, the channel information can be learnt simply by scanning.

As the sensor device (e.g., location monitor) scans for signals transmitted from wireless client devices and records the RSSIs associated with each signal, it can package this information in a wireless frame, and send the wireless frame out as a Layer-2 (i.e., physical layer) broadcast frame similar to the way it sends out a probe frame. This broadcast frame will be transmitted in the same channel as the anchor access point.

Next, a piece of customized software on the access point can receive this frame in a promiscuous mode since the frame was transmitted in the home channel of the access point. The access point can also glean the information in its payload to supply to real-time locating systems (RTLS) servers.

Therefore, a large number of sensor devices (e.g., location monitors) can be deployed without the need for provisioning them. The sensor devices (e.g., location monitors) can be powered up and start working. In other words, the sensor device (e.g., location monitor) then becomes a logical extension of the access point, such that the access point can offload scanning duties to the sensor device (e.g., location monitor) without the need for provisioning them.

There is no security risk in this scheme since the scanned information. This is because the client devices' MAC addresses and the RSSI associated with signals received from the client devices are not confidential, and can be otherwise scanned by any radio in the vicinity. The sensor device (e.g., location monitor) simply reports what it hears.

With the solution provided herein, a network device detects a first wireless signal comprising a beacon frame transmitted by an access point in a network. The network device then identifies a radio Frequency (RF) channel indicated in the beacon frame. Responsive to identifying the RF channel in the beacon frame, the network device selects the RF channel to convey information to one or more network elements using a broadcast frame. Moreover, the network device transmits the broadcast frame to the one or more network elements. Note that, the broadcast frame includes information corresponding to a detected second wireless signal.

Networking Environment

FIG. 1 shows an exemplary network environment according to embodiments of the present disclosure. The network environment as illustrated in FIG. 1 includes at least a controller 110, a location engine 160, a number of APs, such as $AP_A$ 130, $AP_B$ 132, ..., $AP_N$ 139, and a number of client devices, such as $Client_A$ 140, ... $Client_M$ 145, $Client_N$ 146, ..., $Client_Z$ 149, etc.

Each AP provides network services to zero or more client devices. Specifically, each AP operates on a particular wireless communication channel and communicates with its client devices on the particular wireless communication channel. For example, in FIG. 1, $AP_A$ 130 operates on Channel 1 and serves client devices $Client_A$ 140, ... $Client_M$ 145. A neighboring AP $AP_B$ 132 operates on Channel 6 and serves at least $Client_N$ 146, etc. Another neighboring AP $AP_N$ 139 operates on Channel 11 and serves at least $Client_Z$ 149, etc.

Moreover, each AP can periodically switch to scan a plurality of wireless communication channels other than its particular operating wireless communication channels for information collection. However, because the APs cannot continue servicing its client devices while scanning through other wireless communication channels, the channel scanning and information collection can be expensive.

Therefore, in order to allow APs to spend more time serving client devices on its operating wireless communication channel, embodiments of the present disclosure introduces a new type of wireless devices, namely, location monitor devices. A sensor device (e.g., location monitor) is a low cost lightweight device that can be deployed wirelessly without any need to be provisioned.

A sensor device (e.g., location monitor) can communicate with a plurality of access points (APs) via different wireless communication channels. Note that, different APs may have different operating channels. For example, $AP_A$ 130 may be operating on Channel 1; $AP_B$ 132 may be operating on Channel 6; $AP_N$ 139 may be operating on Channel 11; etc. In particular, the sensor device (e.g., location monitor) can collect an Information Element (IE) from a beacon frame received on a particular wireless communication channel (e.g., Channel 1) from an access point (e.g., $AP_A$ 130) located nearby. The sensor device (e.g., location monitor) can retrieve the IE information from the beacon received from $AP_A$ 130, and broadcast on the physical layer the IE information on other wireless communication channels (such as, Channel 6, Channel 11, etc.) to other neighboring APs. Therefore, the sensor device (e.g., location monitor) is able to collect data from multiple operating wireless communication channels of different neighboring APs, and convey information collected to the wireless infrastructure using broadcast frames without the need for any provisioning or wired (e.g., Ethernet) connection. In an ideal scenario, when all APs in the network infrastructure supports the function of such location monitor device, the APs will no longer need to switch to non-operating channels periodically to accomplish various channel scanning tasks.

Location engine 160 generally refers to a device and/or a logical entity that can gather client location information from the network, process it and share it through a standard application programming interface (API). Although only location engine 160 is depicted in FIG. 1, other types of engines also may be deployed in the network to gather other client information from sensor devices. Specifically, location engine 160 calculates the associated and unassociated client device locations periodically. For every client device on the network, location engine 160 can provide at least the following information through the API: client's user name, client's Internet Protocol (IP) address, client's Media Access Control (MAC) address, client device type, client's application firewall data which shows the destinations and applications used by associated devices, client's current location, client's historical locations, etc. Conventionally, APs place data to be able to calculate location for the devices in a network infrastructure for location engine 160. The client information gathered by location engine 160 can be used for analyzing a client's internet behavior for business such as shopping preferences. Note that, location engine 160 may be residing on a server, a cloud computing device, and/or a network device, such as, a network controller, an AP, etc.

Network controller 110 generally refers to a controlling device that manages other network devices such as wireless access points. Network controller 110 may handle automatic adjustments to radio frequency power, wireless channels, wireless authentication, and/or security.

Communication Exchanges

Figure 2:
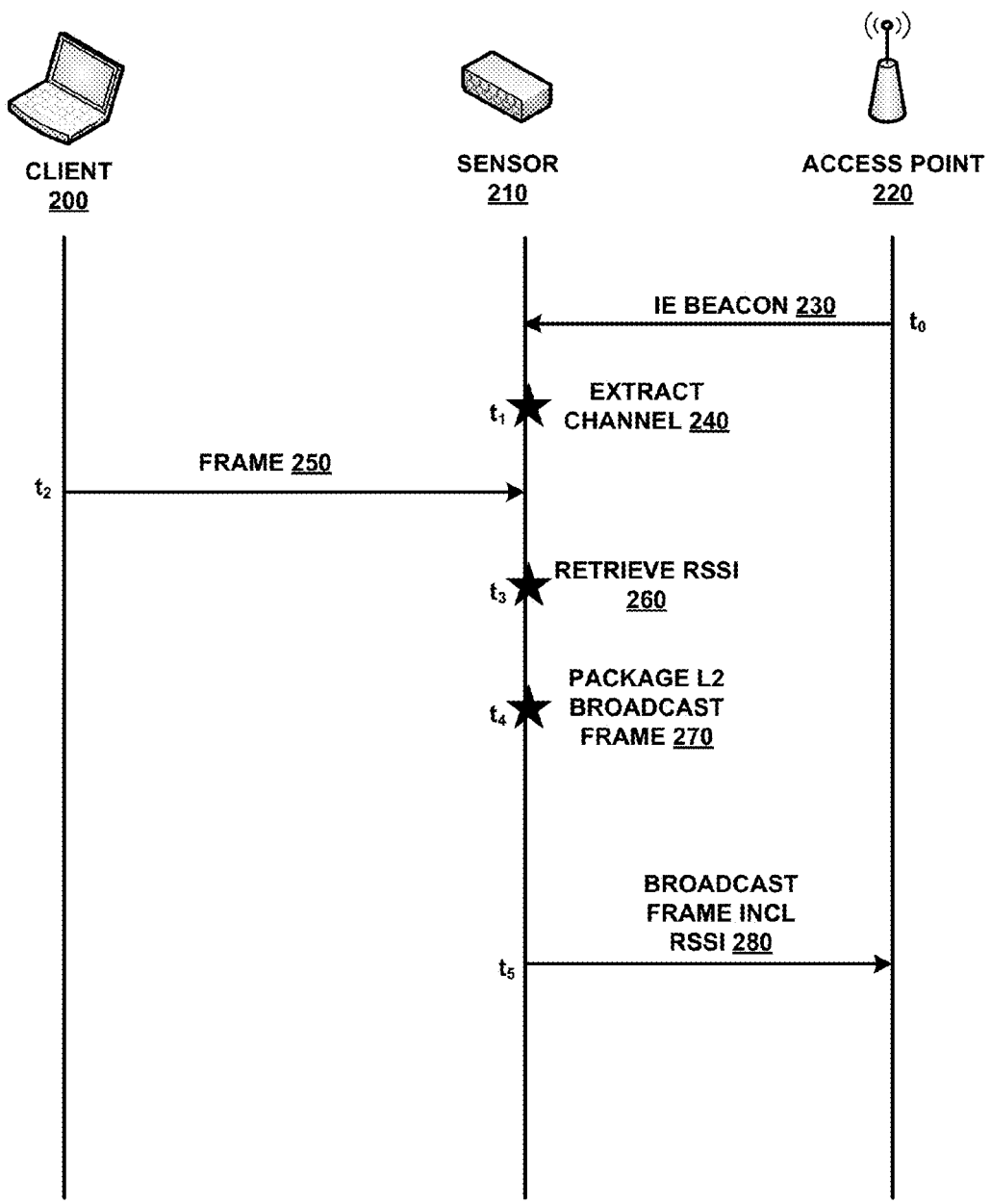
FIG. 2 shows a sequence diagram illustrating exemplary network communication exchanges for conveying information using broadcast frames according to embodiments of the present disclosure.

FIG. 2 shows a sequence diagram illustrating exemplary network communication exchanges for conveying information using broadcast frames according to embodiments of the present disclosure. FIG. 2 includes at least a client device 200, a sensor device 210 (e.g., a location monitor), and an access point 220.

Initially, sensor device 210 can advertise its service to its neighboring APs via an Information Element, and discover a subset of neighboring APs supporting the function of offloading location monitoring and/or channel scanning services to sensor device 210.

Specifically, access point 220 periodically, e.g., at time point $t_0$, broadcast a beacon frame 230. Beacon frame 230 may include, but does not limit to, a Media Access Control (MAC) header, a frame body and a frame check sequence (FCS). In particular, the frame body of beacon frame 230 may include one or more of, a timestamp for synchronization with other neighboring APs, a beacon interval indicating the time interval between beacon transmissions, capability information, service set identifier (SSID), supported rates, Frequency-Hopping (FH) Parameter Set, Direct-Sequence (DS) Parameter Set, Contention-Free (CF) Parameter Set, IBSS Parameter Set, Traffic indication map (TIM), etc. Specifically, beacon frame 230 includes an Information Element (IE) that contains channel information associated with the operating wireless communication channel of the transmitting AP.

Sensor device 210 subsequently receives a beacon frame 230 from access point 220. At time point $t_1$, sensor device 210 extracts channel information 240 from the IE of the received beacon 230. At time point $t_2$, client device 200 transmits a wireless frame 250 to the network. Note that, wireless frame 250 may or may not be transmitted on the operating wireless communication channel of access point 220. However, because sensor device 210 is capable of switching to different wireless communication channels and monitoring multiple wireless communication channels, sensor device 210 can receive wireless frame 250 transmitted from client device 200.

Next, at time point $t_3$, sensor device 210 retrieves the received signal strength indication (RSSI) 260 associated with wireless frame 250. Likewise, as sensor device 210 switches through a plurality of wireless communication channels, sensor device 210 can collect a plurality of information (including but not limited to RSSI) from wireless frames transmitted on the same or different channel from other devices. Note that, wireless frame 210 may be a WiFi frame or a non-WiFi frame. For example, it may indicate a non-WiFi interference signal on a particular wireless communication channel.

Sensor device 210 can cache or store the collected information locally. Then, periodically, for example, at time point $t_4$, sensor device 210 packages the collected information into a layer-2 (i.e., physical layer) broadcast frame 270. Then, at time point $t_5$, sensor device 210 broadcasts 280 the packaged frame 270 (which may include, for example, RSSI information associated with wireless frame 250) on the operating wireless communication channel of access point 220. Note that, other neighboring APs operating or scanning on the same operating wireless communication channel of access point 220 will be able to receive the broadcasted packet 280 as well. Thus, by using a broadcasting mechanism, embodiments of the present disclosure broaden the number of potential devices which might be able to receive such information. It's worth noting that the information in the broadcasted frames does not include any sensitive, personal, and/or private information that cannot be received by other network devices.

Similarly, sensor device 210 can switch to other wireless communication channels on which other supporting APs operate on one by one to broadcast the packaged frame 270. After receiving the broadcast frame 270 from sensor device 210, an AP can analyze the information locally, transmit it to a network controller for processing, or transmit the information directly or indirectly to a local engine in the network.

Information Conveyed

FIG. 3 shows a block diagram illustrating exemplary conveyed information according to embodiments of the present disclosure. Specifically, FIG. 3 includes at least a client MAC address 300, an identifier of broadcast device 320 (e.g., a sensor device), a RSSI 340, etc. Client MAC address 300 is an identifier that uniquely identifiers a client device from which a wireless frame is received. RSSI 340 indicates the signal strength at which a particular sensor device (e.g., a location monitor) receives the wireless frame from the client device. Furthermore, identifier of broadcast device 320 (e.g., the sensor device's radio MAC address) is used to uniquely identify the sensor device (e.g., the location monitor).

Moreover, the conveyed information can also include information extracted from payload of a received wireless frame, received signal strength indicator associated with the received wireless frame, channel quality information (e.g., the amount of channel interference) associated with the wireless communication channel on which the wireless frame is received, information regarding any non-WiFi interferers on the wireless communication channel, and/or any environmental information, such as, temperature, light, motion, etc.

Channel Selection

FIG. 4 shows a block diagram illustrating exemplary information maintained according to embodiments of the present disclosure. FIG. 4 includes at least a channel identifier 400 and an Information Element (IE) timestamp 420. During operations, a sensor device (e.g., a location monitor) continuously listens for beacon frames from APs in the network infrastructure transmitted on different wireless communication channels. As each beacon frame is received by the sensor device (e.g., the location monitor), the sensor device (e.g., the location monitor) creates an entry in a table as illustrated in FIG. 4 to keep track of channel identifier 400 associated with the received beacon and timestamp 420 indicating the time when a beacon is last received on the particular channel. If after a threshold amount of time period has lapsed since any beacon is received on a particular wireless communication channel, the sensor device (e.g., the location monitor) will remove the entry associated with the particular wireless communication channel from the selected channel list as illustrated in FIG. 4. Periodically, the sensor device (e.g., the location monitor) will iterate through the channels in the selected channel list and broadcast packaged frames on each of the selected wireless communication channels.

Note that, the selected channel list is agnostic to the neighboring access points. For example, if, initially, $AP_A$ is operating on Channel 1, $AP_B$ is operating on Channel 6, and $AP_C$ is operating on Channel 11. The selected channel list will include Channel 1, Channel 6, and Channel 11. Assuming that, subsequently $AP_A$ is disconnected from network infrastructure for a period of time, but $AP_D$ joins the radio frequency (RF) neighborhood and starts to operate on Channel 1, then the entry associated with Channel 1 will be maintained in the selected channel list, and the timestamp will corresponds to when a beacon is last received from $AP_D$. If, for example, after a period of downtime, $AP_A$ rejoins the RF neighborhood but switches to operate on Channel 13, then Channel 13 will be added to the selected channel list.

Process for Conveying Information Using Broadcast Frames

Figure 5:
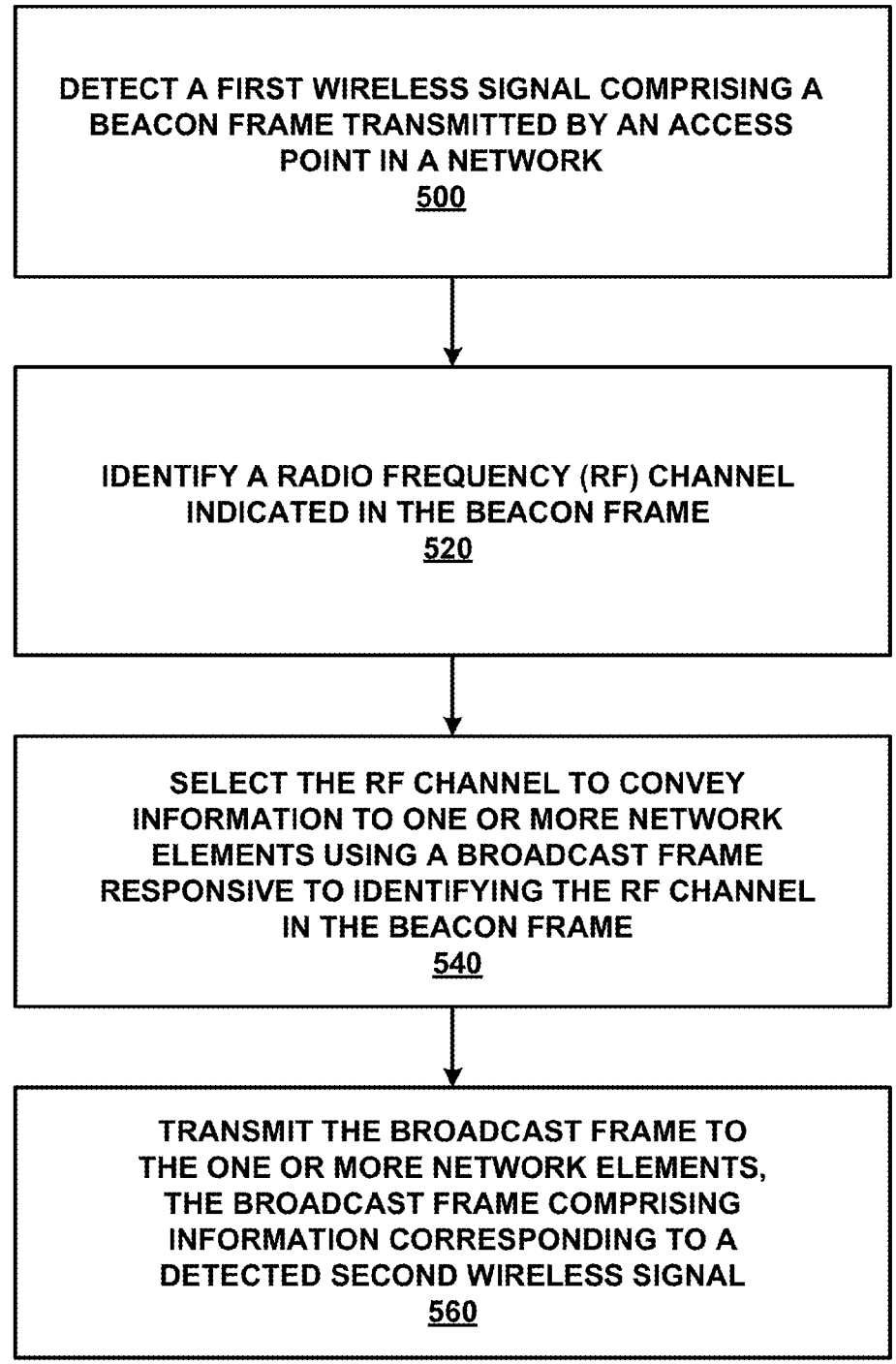
FIG. 5 illustrates an exemplary process for conveying information using broadcast frames according to embodiments of the present disclosure.

FIG. 5 illustrates an exemplary process for conveying information using broadcast frames according to embodiments of the present disclosure. During operations, a network device detects a first wireless signal comprising a beacon frame transmitted by an access point in a network (operation 500). The network device then identifies a radio Frequency (RF) channel indicated in the beacon frame (operation 520). Responsive to identifying the RF channel in the beacon frame, the network device selects the RF channel to convey information to one or more network elements using a broadcast frame (operation 540). Moreover, the network device transmits the broadcast frame to the one or more network elements (operation 560). Note that, the broadcast frame includes information corresponding to a detected second wireless signal.

In some embodiments, the RF channel is indicated in an information element (IE) in the broadcast frame.

In some embodiments, the information corresponding to the detected second wireless signal comprises RSSI information for the detected second wireless signal. In some embodiments, the information corresponding to the detected second wireless signal includes non-sensitive information.

In some embodiments, the operations are performed by a sensor device upon startup and without provisioning Wi-Fi characteristics.

In some embodiments, the information corresponding to the detected second wireless signal comprises data associated with a client device that transmitted the second wireless signal. Here, the second wireless signal can be a non-Wifi signal.

In some embodiments, the information corresponding to the detected second wireless signal comprises data associated with an interfering device.

In some embodiments, the sensor device further detects a third wireless signal including a second beacon frame transmitted by a second access point in the network. The sensor device then identifies a second radio Frequency (RF) channel indicated in the second beacon frame. Responsive to identifying the second RF channel in the second beacon frame, the sensor device selects the second RF channel to convey second information to the one or more network elements using a second broadcast frame. Moreover, the sensor device transmits the second broadcast frame to the one or more network elements, whereas the second broadcast frame includes information corresponding to the detected second wireless signal.

In some embodiments, the sensor device further transmits the broadcast frame to the one or more network elements, the broadcast frame comprising information detected by the network device. Note that, the information may include environmental information detected by the network device. For example, the information comprises temperature information, lighting information, motion information, etc., detected by the sensor device.

System for Conveying Information Using Broadcast Frames

Figure 6:
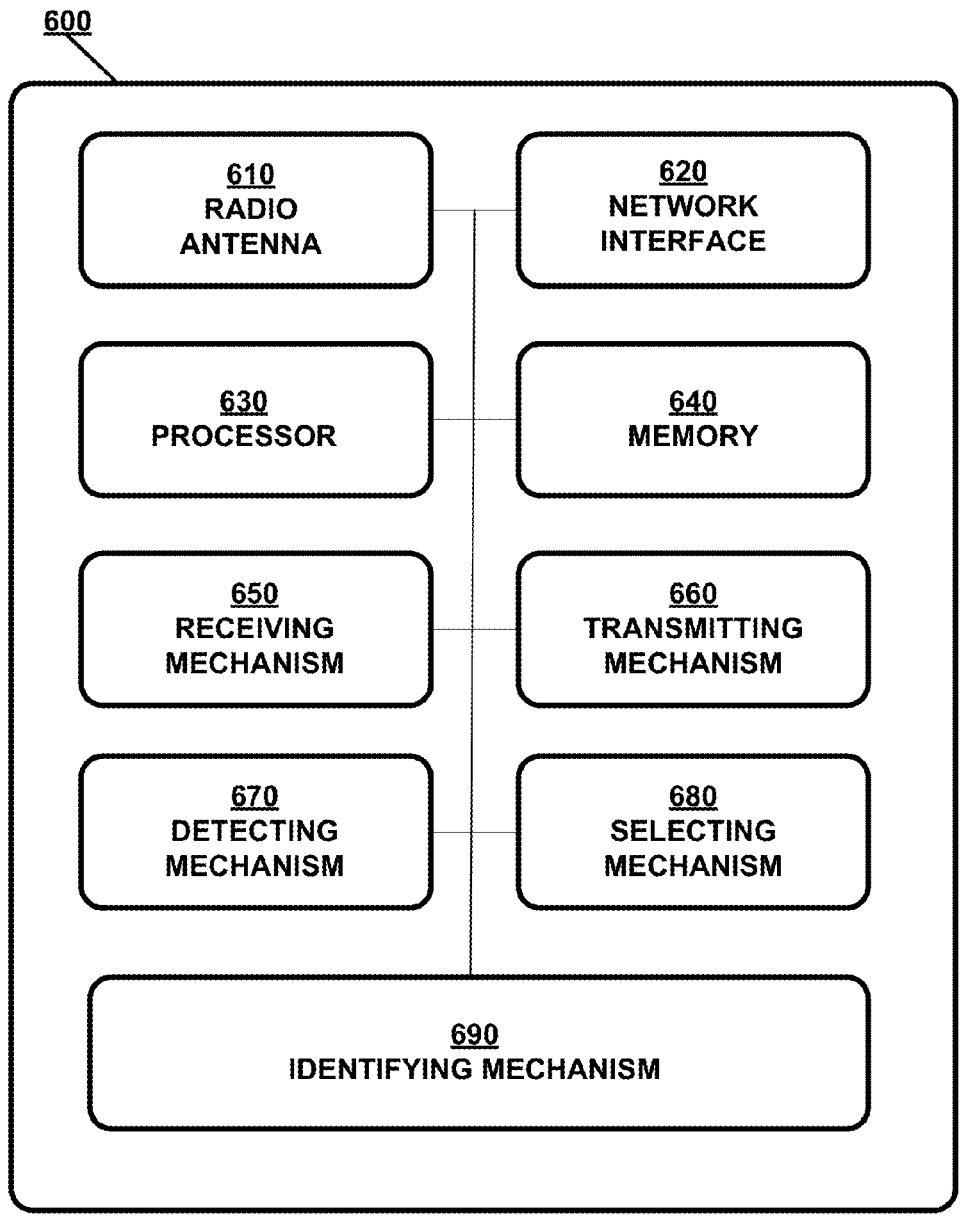
FIG. 6 is a block diagram illustrating an exemplary system for conveying information using broadcast frames according to embodiments of the present disclosure.

FIG. 6 is a block diagram illustrating an exemplary system for conveying information according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a detecting mechanism 670, a selecting mechanism 680, and an identifying mechanism 690, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, requests and/or responses, beacon frames, management frames, control path frames, and so on. Specifically, receiving mechanism 650 can receive from a beacon from an access point. The beacon may include an information element. Moreover, receiving mechanism 650 may receive a wireless frame from a client device in the vicinity and an RSSI associated with the received wireless frame.

Transmitting mechanism 660 generally transmits messages, which include, but are not limited to, requests and/or responses, beacon frames, management frames, control path frames, and so on. Specifically, transmitting mechanism 660 can transmit a wireless broadcast frame on a selected channel (e.g., an operating channel of an anchor access point). The wireless broadcast frame includes information such as, RSSIs associated with the signals received from client devices in the vicinity, environmental information (e.g., temperature, light, motion, etc.).

In some embodiments, the information corresponds to a detected second wireless signal comprising non-sensitive information.

In some embodiments, the operations are performed by a device upon startup and without provisioning Wi-Fi characteristics.

In some embodiments, the information corresponding to the detected second wireless signal comprises data associated with a client device that transmitted the second wireless signal.

In some embodiments, the second wireless signal is a non-WiFi signal. Furthermore, the information corresponding to the detected second wireless signal can include data associated with an interfering device.

In some embodiments, transmitting mechanism 660 further transmits the broadcast frame to the one or more network elements. Here, the broadcast frame comprises environmental information detected by the network device.

Detecting mechanism 770 generally detects a wireless signal comprising a frame transmitted by an access point in a network.

Selecting mechanism 780 generally selects the RF channel to convey information to one or more network elements using a broadcast frame in response to identifying mechanism 790 identifies the RF channel in the beacon frame.

Identifying mechanism 690 generally identifies a radio frequency (RF) channel indicated in a beacon frame received from an access point. Specifically, the RF channel may be indicated in an information element (IE) in the broadcast frame.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor, causes the processor to:
   detect, at a wireless sensor device, a first wireless signal comprising a beacon frame transmitted by an access point in a network;
   determine, at the wireless sensor device, a radio Frequency (RF) channel indicated in the beacon frame;
   select the RF channel to convey information to a network device using a broadcast frame, wherein the RF channel is the RF channel indicated in the beacon frame; and
   transmit, by the wireless sensor device, the broadcast frame to the network device on the determined RF channel, wherein the broadcast frame comprises information corresponding to a detected second wireless signal from a wireless device;
   determine, at the wireless sensor signal, a second radio Frequency (RF) channel indicated in the second beacon frame;
   select the second RF channel to convey a second information to the network device using a second broadcast frame in response to identifying the second RF channel in the second beacon frame;
   transmit the second broadcast frame to the network device, wherein the second broadcast frame comprises information corresponding to the detected second wireless signal.

2. The non-transitory computer readable medium of claim 1, wherein the RF channel is indicated in an information element (IE) in the broadcast frame.

3. The non-transitory computer readable medium of claim 1, where the information corresponding to the detected second wireless signal comprises RSSI information for the detected second wireless signal.

4. The non-transitory computer readable medium of claim 1, where the information corresponding to the detected second wireless signal comprises non-sensitive information.

5. The non-transitory computer readable medium of claim 1, wherein the operations are performed by a device upon startup and without provisioning Wi-Fi characteristics.

6. The non-transitory computer readable medium of claim 1, wherein the information corresponding to the detected second wireless signal comprises data associated with a client device that transmitted the second wireless signal.

7. The non-transitory computer readable medium of claim 1, wherein the second wireless signal is a non-Wifi signal.

8. The non-transitory computer readable medium of claim 1, wherein the information corresponding to the detected second wireless signal comprises data associated with an interfering device.

9. The non-transitory computer readable medium of claim 1, further comprising instructions executable by the processor to cause the processor to:
   detect, at a wireless sensor device, a third wireless signal comprising a second beacon frame transmitted by a second access point in the network.

10. The non-transitory computer readable medium of claim 1, further comprising instructions executable by the processor to cause the processor to:
   transmit, by the wireless sensor device, the broadcast frame to the network device, wherein the broadcast frame comprises information detected by the wireless sensor device.

11. The non-transitory computer readable medium of claim 10, wherein the information comprises environmental information detected by the wireless sensor device.

12. The non-transitory computer readable medium of claim 11, wherein the environmental information comprises temperature information, lighting information, and/or motion information detected by the wireless sensor device.

13. A wireless sensor device comprising:
   a processor;
   a memory;
   a detecting mechanism operating with the processor to detect a first wireless signal comprising a beacon frame transmitted by an access point in a network;
   an identifying mechanism operating with the processor to identify a radio Frequency (RF) channel indicated in the beacon frame;
   a selecting mechanism operating with the processor to select an RF channel to convey information to a network device using a broadcast frame in response to identifying the RF channel in the beacon frame; and
   a transmitting mechanism operating with the processor to transmit the broadcast frame to the network device using the selected RF channel, wherein the broadcast frame comprises information corresponding to a detected second wireless signal from a wireless device;
   a determining mechanism operating with the processor to determine, at the wireless sensor signal, a second radio Frequency (RF) channel indicated in the second beacon frame;
   the selecting mechanism operating with the processor selects the second RF channel to convey a second information to the network device using a second broadcast frame in response to identifying the second RF channel in the second beacon frame;
   the transmitting mechanism operating with the processor transmits the second broadcast frame to the network device, wherein the second broadcast frame comprises information corresponding to the detected second wireless signal.

14. The wireless sensor device of claim 13, wherein the RF channel is indicated in an information element (IE) in the broadcast frame.

15. The wireless sensor device of claim 13, where the information corresponding to the detected second wireless signal comprises RSSI information for the detected second wireless signal.

16. The wireless sensor device of claim 13, where the information corresponding to the detected second wireless signal comprises non-sensitive information.

17. The wireless sensor device of claim 13, wherein the operations are performed by a device upon startup and without provisioning Wi-Fi characteristics.

18. The wireless sensor device of claim 13, wherein the information corresponding to the detected second wireless signal comprises data associated with a client device that transmitted the second wireless signal.

19. The wireless sensor device of claim 13, wherein the second wireless signal is a non-WiFi signal, and wherein the information corresponding to the detected second wireless signal comprises data associated with an interfering device.

20. The wireless sensor device of claim 13, wherein the transmitting mechanism further transmits the broadcast frame to the network device,
   wherein the broadcast frame comprises environmental information detected by the wireless sensor device.

21. The wireless sensor device of claim 20, wherein the environmental information comprises temperature information, lighting information, and/or motion information detected by the wireless sensor device.

* * * * *